(12) United States Patent  (10) Patent No.: US 7,926,407 B1
Hallissy et al.  (45) Date of Patent: Apr. 19, 2011

(54) ARMOR SHIELDING

(76) Inventors: Gerald Hallissy, Port Washington, NY (US); William G. Higbie, Bayshore, NY (US)

( * ) Notice: Subject to any disclaimer, the term of this patent is extended or adjusted under 35 U.S.C. 154(b) by 467 days.

(21) Appl. No.: 11/941,616

(22) Filed: Nov. 16, 2007

(51) Int. Cl.
 *F41H 5/04* (2006.01)
(52) U.S. Cl. .......... 89/36.02; 89/910; 89/930; 109/49.5; 109/80; 109/83
(58) Field of Classification Search ................. 89/36.02, 89/904, 910, 917, 920, 930; 109/49.5, 80, 109/83
See application file for complete search history.

(56) References Cited

U.S. PATENT DOCUMENTS

| | | | |
|---|---|---|---|
| 985,681 A | 2/1911 | Konopinski | |
| 1,476,584 A | 12/1923 | Beeby | |
| 2,410,022 A * | 10/1946 | Dumais | 89/36.02 |
| 3,164,111 A | 1/1965 | Lanni | |
| 3,616,115 A * | 10/1971 | Klimmek | 109/84 |
| 3,732,831 A * | 5/1973 | Marciniak et al. | 109/83 |
| 4,119,748 A | 10/1978 | Verbauwhede et al. | |
| 4,252,471 A | 2/1981 | Straub | |
| 4,404,889 A | 9/1983 | Miguel | |
| 4,559,881 A * | 12/1985 | Lankard et al. | 109/83 |
| 4,593,627 A * | 6/1986 | Lankard et al. | 109/83 |
| 4,709,980 A | 12/1987 | Coll et al. | |
| 4,837,885 A | 6/1989 | Yang | |
| 4,889,258 A | 12/1989 | Yerushalmi | |
| 4,901,498 A | 2/1990 | Gerwick, Jr. | |
| 5,006,386 A | 4/1991 | Menichini | |
| 5,267,665 A | 12/1993 | Sanai et al. | |
| 5,376,426 A | 12/1994 | Harpell et al. | |
| 5,390,580 A | 2/1995 | Gibbons, Jr. et al. | |
| 5,456,752 A | 10/1995 | Hogan | |
| 5,545,455 A | 8/1996 | Prevorsek et al. | |
| 5,628,822 A | 5/1997 | Hogan | |
| 5,668,342 A | 9/1997 | Discher | |
| 5,862,640 A | 1/1999 | Negri | |
| 5,904,972 A | 5/1999 | Tunis, III et al. | |
| 5,981,630 A | 11/1999 | Banthia et al. | |
| 5,993,537 A | 11/1999 | Trottier et al. | |
| 6,029,269 A | 2/2000 | El-Soudani | |
| 6,138,420 A | 10/2000 | Fyfe | |
| 6,159,414 A | 12/2000 | Tunis, III et al. | |
| 6,216,579 B1 | 4/2001 | Boos et al. | |
| 6,309,732 B1 | 10/2001 | Lopez-Anido et al. | |
| 6,333,085 B1 | 12/2001 | Emek | |
| 6,500,507 B1 | 12/2002 | Fisher | |
| 6,544,624 B1 | 4/2003 | Lopez-Anido et al. | |
| 6,601,357 B2 | 8/2003 | Tunis | |
| 6,685,387 B2 | 2/2004 | Allen et al. | |
| 6,773,655 B1 | 8/2004 | Tunis, III et al. | |
| 6,806,212 B2 | 10/2004 | Fyfe | |

(Continued)

FOREIGN PATENT DOCUMENTS

EP 0 897097 2/1999

(Continued)

*Primary Examiner* — Michael Carone
*Assistant Examiner* — Jonathan C Weber

(57) ABSTRACT

A shield for shielding structures, vehicles and personnel from a projectile and/or an explosive blast generally includes a substantially planar shield plate adapted for attachment to a structure to provide protection to the structure. The shield plate includes a chassis having an interior surface facing the structure and an opposite outer surface, and a ballistic liner disposed on the outer surface of the chassis such that the chassis is more proximal the structure than the ballistic liner. The ballistic liner has an exterior surface facing the exterior environment.

25 Claims, 11 Drawing Sheets

U.S. PATENT DOCUMENTS

| | | |
|---|---|---|
| 6,811,877 B2 | 11/2004 | Haislet |
| 6,862,847 B2 | 3/2005 | Bigelow |
| 6,868,645 B2 | 3/2005 | Hauser |
| 6,873,920 B2 | 3/2005 | Dunleavy et al. |
| 6,887,309 B2 | 5/2005 | Casanova et al. |
| 6,917,817 B1 | 7/2005 | Farrow et al. |
| 6,964,219 B2 | 11/2005 | Gilon |
| 6,971,817 B2 | 12/2005 | Allen et al. |
| 6,973,864 B1 * | 12/2005 | Ahmad .............. 89/36.02 |
| 6,991,124 B1 | 1/2006 | Palley et al. |
| 7,014,059 B2 | 3/2006 | Reynolds |
| 7,144,625 B2 | 12/2006 | Tunis |
| 7,200,973 B2 | 4/2007 | Tunis |
| 7,305,799 B2 | 12/2007 | Smelser et al. |
| 7,373,758 B2 | 5/2008 | Tsai et al. |
| 2002/0062619 A1 | 5/2002 | Houser |
| 2002/0152881 A1 | 10/2002 | Stevens et al. |
| 2003/0064191 A1 | 4/2003 | Fisher |
| 2003/0085482 A1 | 5/2003 | Sincock et al. |
| 2004/0054035 A1 | 3/2004 | Hallissy et al. |
| 2004/0194614 A1 | 10/2004 | Wang |
| 2005/0091938 A1 | 5/2005 | Wobben |
| 2005/0144900 A1 | 7/2005 | Hallissy et al. |
| 2005/0188825 A1 | 9/2005 | Sharpe et al. |
| 2005/0204696 A1 | 9/2005 | Hall |
| 2005/0242093 A1 | 11/2005 | Sharpe et al. |
| 2005/0262998 A1 * | 12/2005 | Ahmad .............. 89/36.02 |
| 2005/0285102 A1 | 12/2005 | Walton |
| 2006/0021682 A1 | 2/2006 | Saha et al. |
| 2006/0042115 A1 | 3/2006 | Karr et al. |
| 2006/0070281 A1 | 4/2006 | Passannante |
| 2007/0137471 A1 | 6/2007 | Mazur |
| 2008/0092731 A1 | 4/2008 | Hall |
| 2009/0095147 A1 | 4/2009 | Tunis et al. |
| 2009/0169855 A1 | 7/2009 | Tunis |

FOREIGN PATENT DOCUMENTS

| | | |
|---|---|---|
| GB | 13187 | 5/1973 |
| GB | 22382 | 5/1991 |
| KR | 240376 | 1/2000 |
| WO | WO 9107275 | 5/1991 |
| WO | WO 9802607 | 1/1998 |
| WO | WO 2005014964 | 2/2005 |
| WO | WO 2005098343 | 10/2005 |

* cited by examiner

ARMOR SHIELDING

BACKGROUND OF THE INVENTION

The present invention relates generally to blast and ballistic shielding and more particularly to energy absorbing armor shielding for existing structures and vehicles, as well as personnel, which provides protection especially from projectiles with and without the effects of a blast.

Due to increased threats and awareness of potential terrorist activities, increased attention is being given to protecting structures of all types against damage from projectiles, fire, explosion, and other threats, malicious and accidental. Exposed structural elements of buildings and transportation infrastructure are particularly vulnerable targets for terrorist activity. Thus, there is a need for projectile-resistant and blast and/or ballistic impact shielding for use in both existing and new construction for vehicles and exposed structures.

Ballistic threats do not remain the same over time. Military organizations, terrorists and insurgents are always looking for more aggressive means of destroying armaments. Earlier generations of weapons such as poison arrows, slingshots, single shot muskets, and single shot rifles have morphed into modern multiple shot automatic weapons, armor piercing incendiary bullets, improvised explosive devices and explosively formed penetrators. It is not uncommon today for armor piercing bullets or other metal fragments resulting from an improvised explosive device or explosive formed penetrators to perforate heavy armor consisting of steel, various metal alloys and composite assemblies.

In this regard, the use of ballistic and blast resistant panels or barriers are well known and take on a variety of configurations for providing protection to buildings, vehicles, ships, airplanes and a variety of other applications where armor or other protection is required. It has become increasingly more important to incorporate effective shielding features and systems in vehicles and building structures. Specifically, the goal of armoring modern vehicles is to increase the functionality of armor defeat mechanisms yet reduce the heavy armament which makes vehicles less maneuverable while consuming large amounts of fuel during transport. Moreover, it is important to protect existing building structures and retrofit vehicles which are still vulnerable.

Conventional armor, which may be provided for existing structures or vehicles, is typically solid metallic armor made of steel, aluminum, titanium and alloys thereof. Such solid metallic armor typically possesses significant stopping power to a blast or ballistic threat. However, the steel and aluminum metallic armor has several drawbacks, including low weight efficiency compared to other available systems, such as composite systems. Titanium systems, on the other hand, typically perform better than steel and aluminum, but titanium is extremely expensive and may be cost prohibitive for many applications.

Recently, various improvements on traditional armor have been proposed. For example, commonly owned US Patent Application Publication No. 2005/0144900 A1, published Jul. 7, 2005 to Hallissy et al. discloses blast resistant prefabricated wall panels that contain at least one panel consisting of two structural boards having a thermoset resin-impregnated fiber reinforcing layer there between and extending from sides of the panel. The extension is wrapped at least partially around metal sole and top plates of a metal sole plate, top plate, and stud construction. The panels are capable of resisting explosive blasts without forming secondary projectiles, and are preferably attached to a building structure by energy absorbing deformable brackets.

Also, commonly owned U.S. patent application Ser. No. 11/499,101 by Hallissy et al. discloses a shield for shielding a structural member from an explosive blast or accidental or malicious destruction. The shield includes a plurality of shield members which include cast ultra high strength concrete, wherein the shield members are capable of being assembled to enclose at least a portion of the structural member to provide protection to the enclosed portion from, for example, an explosive blast. In one embodiment, the shield members include a chassis, at least one ballistic liner disposed on the energy absorbing layer, and a concrete-integrating structure.

Accordingly, it would be desirable to provide a shielding system for existing structures and vehicles that is relatively inexpensive and has acceptable weight efficiency. It would be further desirable to provide such a system which can be easily incorporated in or on existing structural elements or vehicles and which can protect such structural elements or vehicles against damage from projectiles and/or explosive devices, both in terms of the energy created by the projectile and its explosion per se as well as from flying objects/debris created during explosive blasts.

SUMMARY OF THE INVENTION

According to the present invention, a shield for protection against projectiles and/or an explosive blast is provided. The shield generally includes a chassis including a metal shield plate having an interior surface and an opposite exterior surface and a ballistic liner disposed on the exterior surface of the shield plate. The ballistic liner is made of a cast ultra high strength concrete and defines an exterior impact surface.

In a preferred embodiment, the chassis further includes a peripheral wall extending upward from the exterior surface of the shield plate, wherein the shield plate and the peripheral wall forms a compartment for receiving the ballistic liner. The chassis further preferably includes a metal forward plate attached to the shield plate so as to sandwich the ballistic liner therebetween. The shield chassis of the present invention can further include a metal spall plate attached at the interior surface of the shield plate and/or a ballistic catcher made from a ballistic fabric attached at the interior surface of the shield plate for catching any fragments which may break apart from said shield.

Also, the chassis further preferably includes an internal deflector structure attached to the shield plate and embedded within the ballistic liner for deflecting a projectile passing through the impact surface of the ballistic liner. The internal deflector structure preferably includes at least one projectile deflecting rib extending upwardly from the shield plate, wherein the rib presents an angled surface with respect to the ballistic liner impact surface for deflecting a projectile passing through the impact surface of the ballistic liner. The projectile deflecting rib can include a peak portion facing the ballistic liner impact surface and a mid-portion defining the angled surface extending from the peak portion to the shield plate for deflecting the projectile. The projectile deflecting rib is also preferably a cantilevered element having one end fixed to the shield plate and an opposite free end extending away from the shield plate, wherein the free end is movable with respect to the fixed end.

The ultra high strength concrete of the present invention preferably contains metallic fibers and has a flexure strength Rfl measured on prismatic samples, higher than or equal to 15 MPa and a compression strength Rc measured on cylindrical samples, higher than of equal to 120 MPa, said flexural strength and compression strength being evaluated at the end of a 28 day time period.

The shield of the present invention can further include at least one data sensor embedded in the ballistic liner for detecting a threat to the shield. The sensor preferably detects a threat selected from the group consisting of an elevated temperature, excessive vibrations, an explosive blast and others events affecting the integrity of the shield. A source of electrical energy which is solar powered is also preferably provided for operating the sensor.

The ballistic liner and/or the forward plate can include a plurality of outwardly extending protrusions for deflecting a projectile and/or dispersing the impact of a blast. Also, the interior surface of the shield plate can have a substantially concave curvature for deflectably absorbing the impact of a blast.

The present invention further involves a method for shielding a structure from damage from a projectile and/or an explosive blast. The method generally includes the steps of providing a chassis including a metal shield plate having an interior surface and an opposite exterior surface, casting an ultra high strength concrete on the exterior surface of the shield plate to form a ballistic liner, wherein the ballistic liner has an exterior impact surface facing the exterior environment and attaching the chassis to the structure, wherein the shield plate is more proximal the structure than the ballistic liner.

The method further preferably includes the step of attaching an internal deflector structure to the shield plate prior to casting the ballistic liner. The internal deflector structure has at least one projectile deflecting rib extending upwardly from the shield plate. The rib presents an angled surface with respect to the ballistic liner impact surface for deflecting a projectile passing through the impact surface of the ballistic liner. The method can further include the step of attaching at least one bracket to the structure and the chassis attaching step can include the step of attaching the chassis to said bracket.

In a preferred embodiment, the method involves shielding a tunnel structure for conveying people and/or vehicles. The tunnel structure includes a floor and a side wall, and wherein the attaching step includes the step of attaching the chassis to at least one of the floor and side wall of the tunnel, wherein the shield plate is more proximal the floor and/or side wall than the ballistic liner. In this tunnel scenario, the interior surface of the shield plate preferably has a substantially concave curvature, wherein the concave curvature faces the floor and/or sidewall of the tunnel structure for deflectably absorbing the impact of a blast.

The present invention can further take the form of an armor shield wearable by a person for shielding from a projectile and/or an explosive blast. In this case, the shield generally includes a chassis including a metal shield plate having an interior surface and an opposite exterior surface, a cast ultra high strength concrete ballistic liner disposed on the exterior surface of the shield plate, a fabric ballistic catcher containing the chassis and the ballistic liner to form a shield pack and a clothing article wearable by a person, wherein the shield pack is inserted in the clothing article.

In all of the embodiments described above, the chassis is preferably made from a metal selected from the group consisting of aluminum, steel, stainless steel, titanium, and alloys or mixtures thereof. The metallic fibers of the cast ultra high strength concrete, which may include steel fibers, may be present in an amount of up to about 120 kg/m$^3$, and, more preferably, in an amount of about 20 to about 120 kg/m$^3$ of concrete, and even more preferably, in an amount of about 40 to about 100 kg/m$^3$ of concrete.

The ultra high strength concrete of the structure shield preferably has a lower thickness limit of not less than about 0.5 inches, and more preferably is not less than about 1.0 inches, and even more preferably is not less than about 1.5 inches. At its upper end, the ultra high strength concrete has an upper thickness limit of not greater than about 4.0 inches, and more preferably is not greater than about 3.0 inches, and even more preferably is not greater than about 2.5 inches. The ultra high strength concrete of the wearable personnel shield preferably has a thickness of between about 0.375 inches and about 0.5 inches. Any combination of upper and lower limits of thickness set forth above can be combined and used as part of this invention.

As a result of the present invention, a shielding system is provided that is relatively inexpensive and has acceptable weight efficiency. The benefit of the armor shielding of the present invention concerns the potential for defeating modern aggressive threats while reducing vehicle weight. Various steel alloys used in armaments are approximately 500-600 lbs per cubic foot and are very expensive. In contrast, an ultra high performance concrete ballistic liner according to the present invention weighs approximately 167 per cubic foot. Such high performance concrete is not readily attachable to vehicles that are made primarily of steel. Therefore, this invention incorporates such a high performance concrete into composite assemblies utilizing various metals which are more easily attached to a vehicle chassis by welding, screwing, hinging, etc. and are lighter in weight than solid metal armor.

Additional objects, advantages and novel features of the invention will be set forth in part in the detailed description which follows, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

Preferred embodiments of the invention have been chosen for purposes of illustration and description and are shown in the accompanying drawings, wherein.

DETAILED DESCRIPTION OF THE INVENTION

The present invention provides a shield that is relatively inexpensive and is easily constructed, which shields vehicles, personnel and existing structures from a projectile, such as a bullet, and/or an explosive blast and fire. The shield can be adapted to be incorporated, assembled or otherwise secured on a moving vehicle, or the shield can be installed on an existing stationary structure, or the shield can be worn by a person. As used herein, the term "structure" is meant to encompass both stationary structures, such as commercial and residential buildings, bridges, tunnels, radio or television broadcast towers, viaducts, pipelines and the like, as well as moving vehicles, including automobiles, buses, trains, ships, airplanes, military vehicles etc. Moreover, while the term "structure" is used frequently herein to refer to the thing being shielded, the shield of the present invention is adaptable to shield human personnel and other living things.

Figure 1:
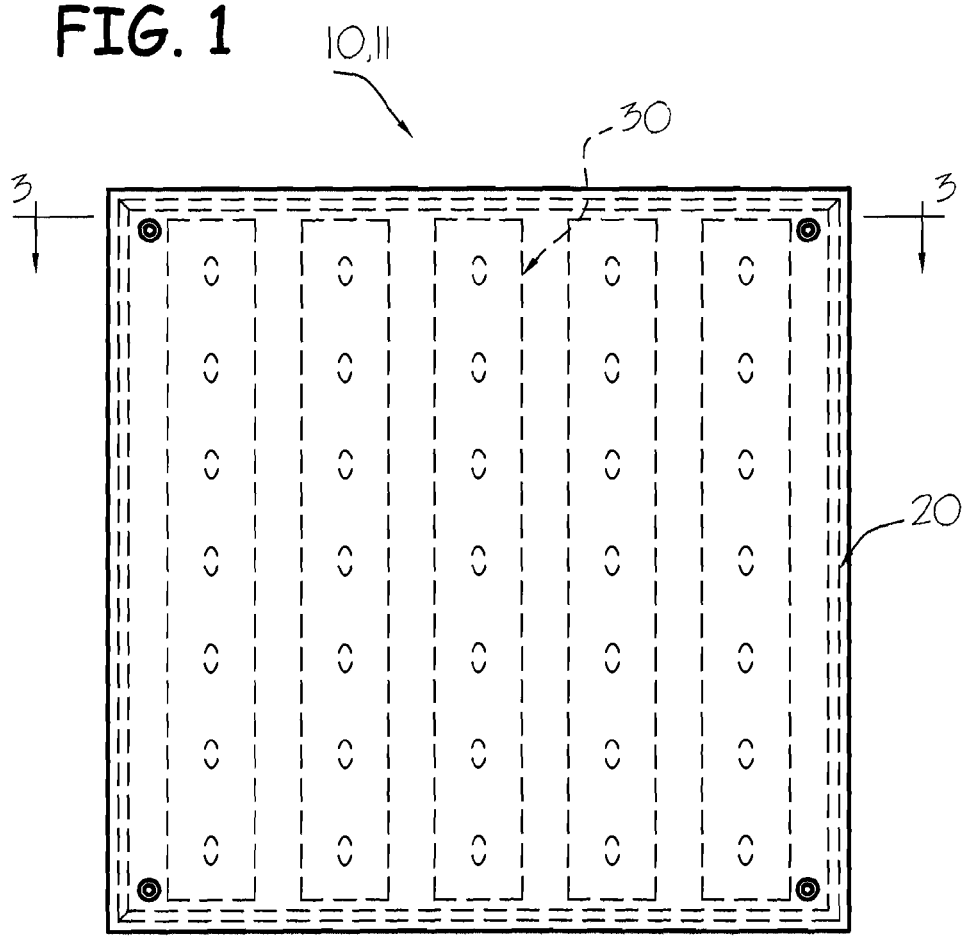
FIG. 1 is a plan view of a preferred embodiment of an armor shield according to the present invention.
Figure 2:
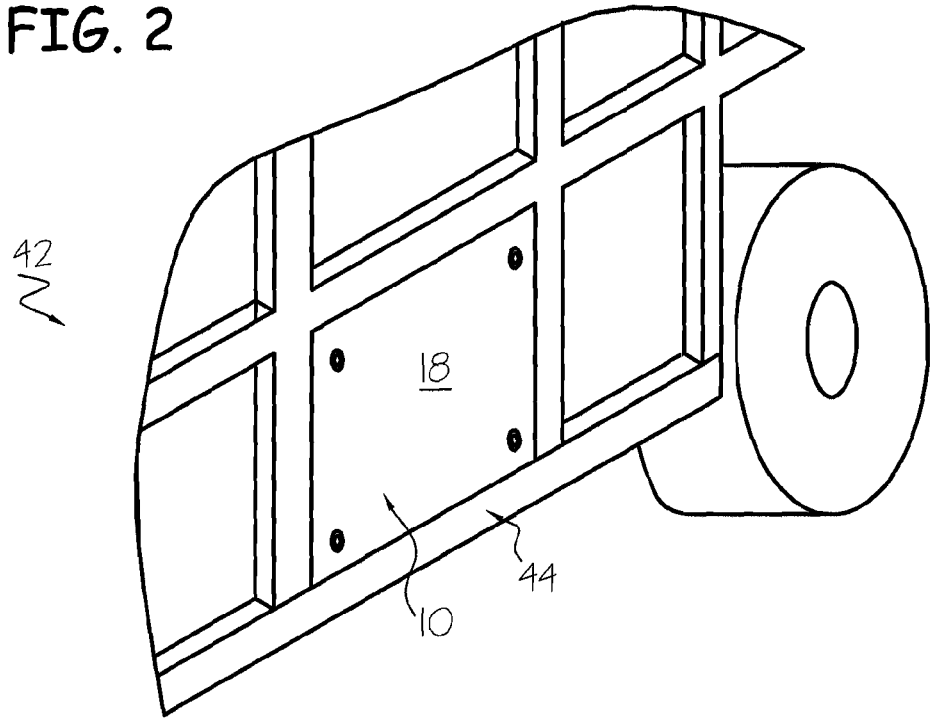
FIG. 2 is a perspective view of the shield shown in FIG. 1 fixed within the frame of a vehicle.
Figure 3:
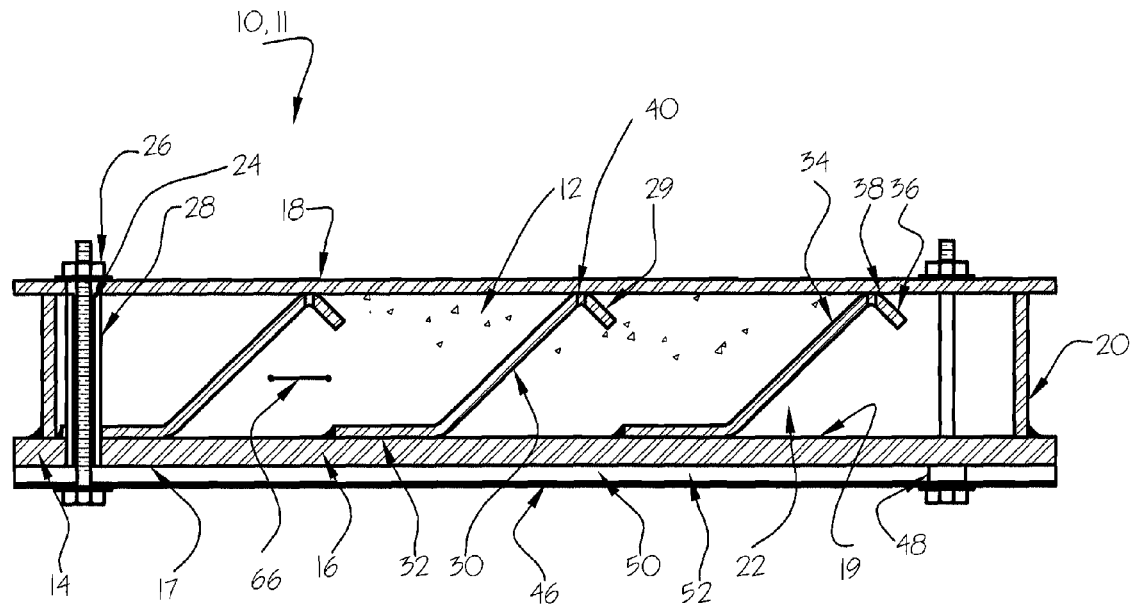
FIG. 3 is a cross-sectional view of the shield shown in FIG. 1 taken along the line 3-3.

FIGS. 1-3 illustrate a preferred embodiment of a shield 10 according to the present invention. The shield 10 is generally in the form of a substantially planar plate 11, which, as will be discussed in further detail below, is preferably prefabricated and which can be incorporated in new construction or manufacture or can be adapted for attachment or assembly to existing structures/vehicles, or worn by personnel. As used herein, the term "substantially planar" is meant to encompass plates with some slight curvature, such as would be required to match, for example, the outer contour of an exterior panel of a vehicle or a ship.

The shield plate 11 generally includes a shield member 12, made mainly of pre-cast ultra high strength concrete, and a chassis 14, which is adapted to be attached to a structure. The shield member 12, also termed a ballistic liner, is preferably incorporated within the chassis 14 by casting ultra high strength concrete onto the chassis, as will be discussed in further detail below.

The ultra high strength concrete material should be capable of absorbing and distributing energy from the impact of a projectile or an explosive blast, so that the integrity of a structure shielded by the shield 10 is preserved after the impact of a projectile or an explosive blast occurs external to the shield. The ultra high strength concrete is preferably an ultra high strength reactive powder concrete that contains ductile fibers. The fibers are preferably of a type and present in an amount sufficient to absorb energy transmitted by the impact or blast itself and to enhance protection from flying debris secondary to the blast. The fibers can be high carbon steel or poly vinyl alcohol fibers. One example of a suitable concrete material for use in the present invention is disclosed in U.S. Pat. No. 6,887,309 to Casanova et al., which is incorporated herein by reference in its entirety, and sold under the name Ductal® by LaFarge. Another example of a suitable concrete material is disclosed in U.S. Pat. No. 6,868,645 to Hauser, the specification of which is incorporated herein by reference in its entirety.

The LaFarge concrete has metallic fibers dispersed in a composition having a cement; ultrafine elements with a pozzolanic reaction; granular elements distributed into two granular classes ($C_1$)>1 mm and <5 mm and ($C_2$) ranges from 5 to 15 mm; cement additions; an amount of water E added in the mixture; a dispersant, and preferably a superplasticizer; metallic fibers, in an amount maximum equal to 120 kg per $m^3$ of concrete, the contents of the various components (a), (b), ($C_1$), ($C_2$), (d) and the amount of water E, expressed in volume, meeting the following relationships: ratio 1: $0.50 \leq (C_2)/(C_1) \leq 1.20$; ratio 2: $0.25 \leq [(a)+(b)+(d)]/[(C_1)+(C_2)] \leq 0.60$; ratio 3: $0.10 \leq (b)/(a) \leq 0.30$; ratio 4: $0.05 \leq E/[(a)+(b)+(d)] \leq 0.75$; ratio 5: $(d)/(a) \leq 0.20$. The cement includes particles having grain size D50 ranging from 10 to 20 mm, and the ultrafine granular sizes having grain size D50 of maximum 1.0 mm.

The wall thickness of the ultra high strength concrete is preferably from about 0.5 inch to about 4.0 inches, more preferably from about 1.0 inch to about 2.0 inches, and most preferably from about 1.25 inches to about 1.5 inches. Thus, the lower limits of the wall thickness is not less than about 0.5 inches, preferably not less than about 1.0 inches, and most preferably not less than about 1.25 inches; whereas the upper limit of the wall thickness is not greater than about 4.0 inches, preferably not greater than about 2.0 inches, and most preferably not greater than about 1.5 inches.

The chassis 14 includes at least a rear plate 16 and a peripheral wall 20 rising perpendicularly from the rear plate and extending around the periphery of the rear plate. The rear plate 16 defines an interior surface 17 facing the structure to be protected and an exterior surface 19, upon which the concrete ballistic liner 12 is disposed. The chassis 14 further preferably includes a forward plate 18 (also termed an impact plate or a blast defeating layer) attached to the rear plate 16 on the exterior side so as to sandwich the ballistic liner 12 therebetween. The rear plate 16, the forward plate 18 and the wall 20 are preferably made of metal, such as steel, aluminum, stainless steel, titanium, and mixtures and/or alloys thereof. The wall 20 may be made from a plurality of wall members disposed end to end so as to continuously extend around the periphery of the shield 10. The wall 20 is fixed to the rear plate 16, preferably by welding, and together with the rear plate forms a compartment 22 into which the ballistic liner 12 is received. The forward plate 18 is attached to the rear plate 16 with bolts 24 and nuts 26. In this regard, sleeves 28 are preferably provided between the forward and rear plates to receive respective bolts 24. The sleeves 28 are preferably welded to the rear plate 16 and include an inner diameter sized to receive the bolts 24.

Also preferably disposed within the compartment 22 defined between the front and rear plates 18 and 16 is an internal deflector structure 29 for deflecting a projectile or the impact of a blast. As shown in FIG. 3, the internal deflector structure 29 is preferably formed by a plurality of projectile deflecting ribs 30 extending along the length of the shield between opposite side walls 20. The ribs 30, which are also preferably made of metal, are cantilevered Z- or S-shaped members having one end 32 fixed to the rear plate 16, such as by welding. Extending at an angle from the fixed end 32 of the rib 30 is a mid-portion 34 which terminates at a bent lip portion 36. The mid-portion 34 and the lip portion 36 form a peak 38 facing the forward plate 18. The peak 38 of each rib 30 is preferably positioned above the fixed end 32 of an adjacent rib so that only angled surfaces of the ribs face the forward plate 18. Thus, a projectile impacting and passing through the forward impact plate 18 will strike either the angled mid-portion 34 or the bent lip portion 36 of a rib 30 and be deflected by the rib so as to disperse the force of the impact.

The shield 10 of the present invention may also include an additional spall plate 46 attached to the exterior of the rear plate 16 with the same nuts 26 and bolts 24 used to attach the forward plate 18. The spall plate 46, which is preferably made from metal, may be provided to catch any fragments of the shield 10 which may break apart upon projectile impact. The spall plate 46 may be spaced apart from the rear plate 16 by a washer 48 provided beneath the head of the bolt 28 to form a space 50 therebetween.

A ballistic catcher 52 may be provided in addition to, or instead of, the metal spall plate 46. The ballistic catcher 52 is made from a ballistic fabric or mesh made from a refractory material such as ceramic fibers. For example, the catcher 52 can be Kaowool™ refractory blanket or Inswool™ refractory blanket. Typically, the catcher 52 is a woven or non-woven textile fabric, or textile fabric of both woven and non-woven material. Suitable materials include glass fibers of all types, polyaramide fibers such as Kevlar® polyaramide fiber; high modulus polyolefin fiber such as SPECTRA® polyethylene fiber; aliphatic polymide fibers; steel fibers, including those of stainless steel; titanium fibers; carbon fibers; ceramic fibers; PVA fibers; and the like. The fibers may be present as individual fibers, tows or strands of fibers, yarn woven from fibers or from strands, or in any suitable combination. Yarn, strands, tow, etc., may consist of a single type of fiber or a plurality of different types of fibers. The fibers are preferably continuous fibers, however, chopped fibers such as staple fibers are lengths of about 1 cm to about 7 cm, or longer discontinuous fibers, e.g., having length in excess of 7 cm, are also useful, particularly when used in conjunction with continuous fibers.

These woven or non-woven sheet materials may be used as a single layered composite sheet material or may be composed of multiple layers. By way of example, two woven polyaramide fabrics may sandwich a further woven or non-woven layer of steel mesh; conventional natural or synthetic fiber fabric, woven or non-woven; a layer of flexible foam, i.e., a polyolefin or polyurethane foam; or a layer of unconsolidated or fully or partially consolidated chopped fibers. These examples are not limiting. A preferred example for a catcher 52 material is SPECTRA® manufactured by Honeywell. The ballistic catcher 52 can be sandwiched between the spall plate 46 and the rear plate 16 for additional armor protection, or the ballistic catcher can be attached to the rear plate without the spall plate.

The shield 10 is fabricated as follows. With the wall 20, sleeves 28 and ribs 30 welded to the rear plate 16 as described above, the rear plate is supported from below so that the compartment 22 is open and faces upwardly. The concrete 12 is then poured within the compartment 22 to fill the compartment, while the continuous side wall 20 retains the concrete within the compartment. As can be appreciated, the internal deflector structure 29 of the present invention also functions as a concrete integrating structure to help secure the concrete within the compartment 22. To allow air trapped beneath the ribs 30 to escape as the concrete is being poured, the peaks 38 of the ribs are preferably provided with holes or slots 40 spaced along the length of each rib. Once the concrete 12 has been cast, bolts 24 can be inserted within the sleeves 28 and the forward plate 18 can be attached with nuts 26 to close the compartment 22. The concrete ballistic liner 12 is thus sandwiched between the rear and front plates 16 and 18 making up the chassis 14.

As shown in FIG. 2, the shield 10 of the present invention can be incorporated into a structure, such as a vehicle 42 upon manufacture of the vehicle. For example, the shield 10 may be provided as a prefabricated panel which becomes an integral part of the structure. Thus, the shield 10 may be welded or otherwise attached to the framework 44 of a vehicle upon manufacture or retrofitting, wherein the forward plate 18 faces the exterior and forms an exterior surface of the vehicle. Similarly, the shield 10 may be provided in panel form and welded or otherwise attached to the framework of a building, wherein the shield forms part or all of a wall of the building.

Figure 4:
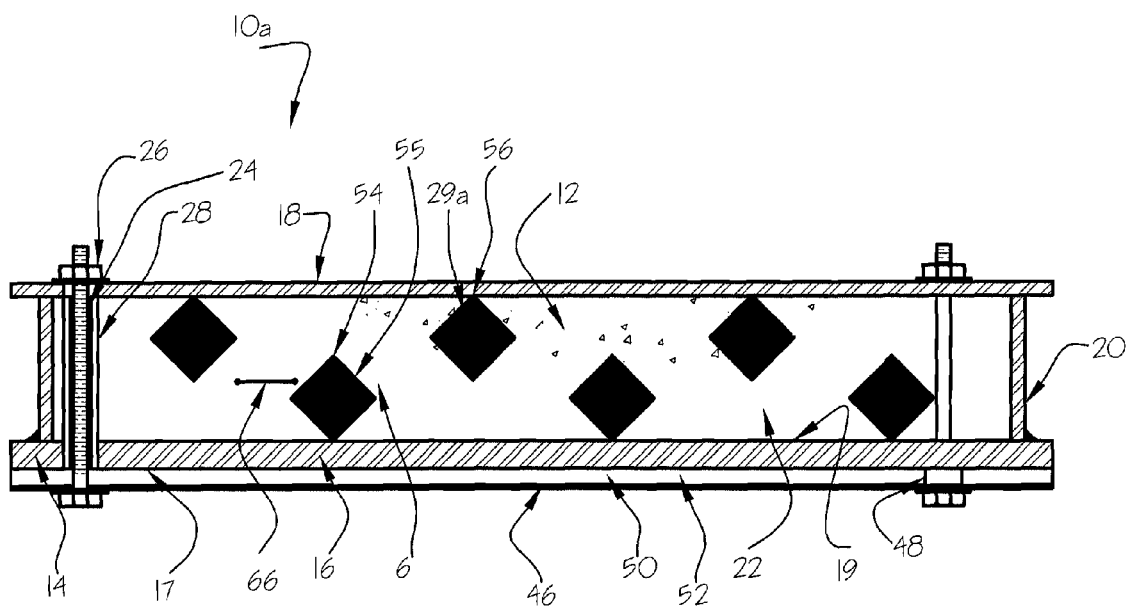
FIG. 4 is a cross-sectional view of an alternative embodiment of the shield according to the present invention.

Turning now to FIG. 4, wherein like elements have the same reference numeral, in an alternative embodiment of the shield 10*a*, the internal deflector structure 29*a* can take the form of a plurality of square or rectangular shaped rods 54 welded to the rear and front plates 16 and 18. The rods 54 are preferably made from metal and are oriented within the shield compartment 22 so as to present faces 55 that are angled with respect to the planes defined by the rear and front plates 16 and 18. This can be accomplished by welding an edge or corner 56 of each rod 54 to its respective plate 16, 18. Also, the rods 54 are preferably interspersed and spaced within the compartment 22 so as to present continuous deflecting surfaces. In other words, the rods 54 are positioned so that there are no substantial gaps between adjacent rods which would permit a projectile to pass through the compartment 22 without striking a face 55 of a rod.

Figure 5:
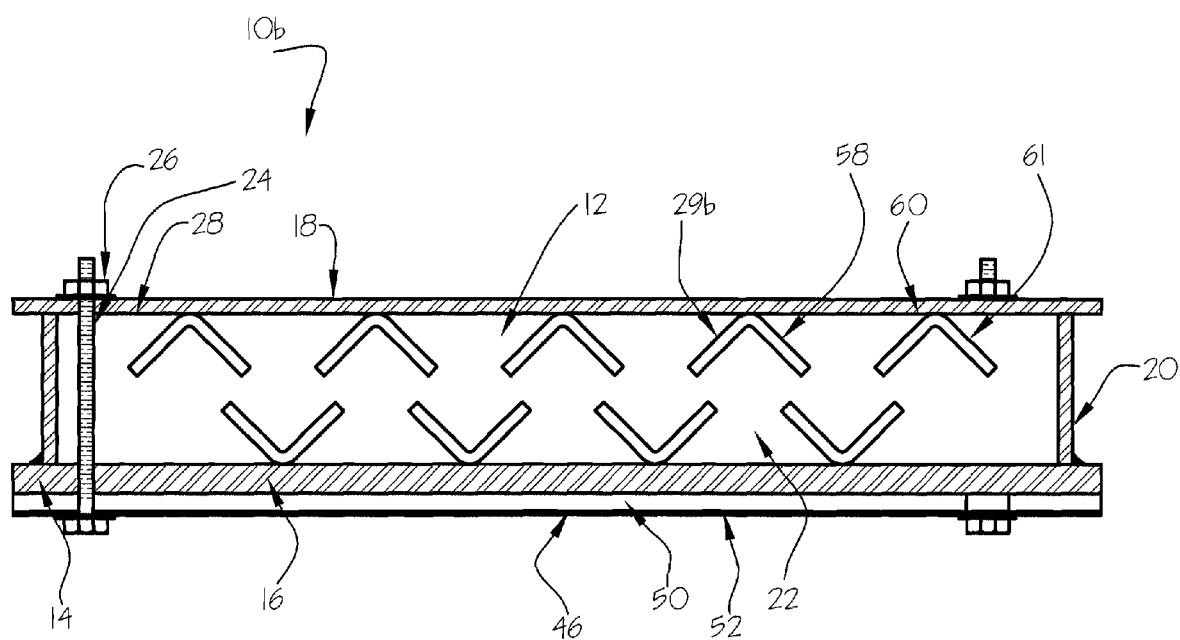
FIG. 5 is a cross-sectional view of another alternative embodiment of the shield according to the present invention.
Figure 6:
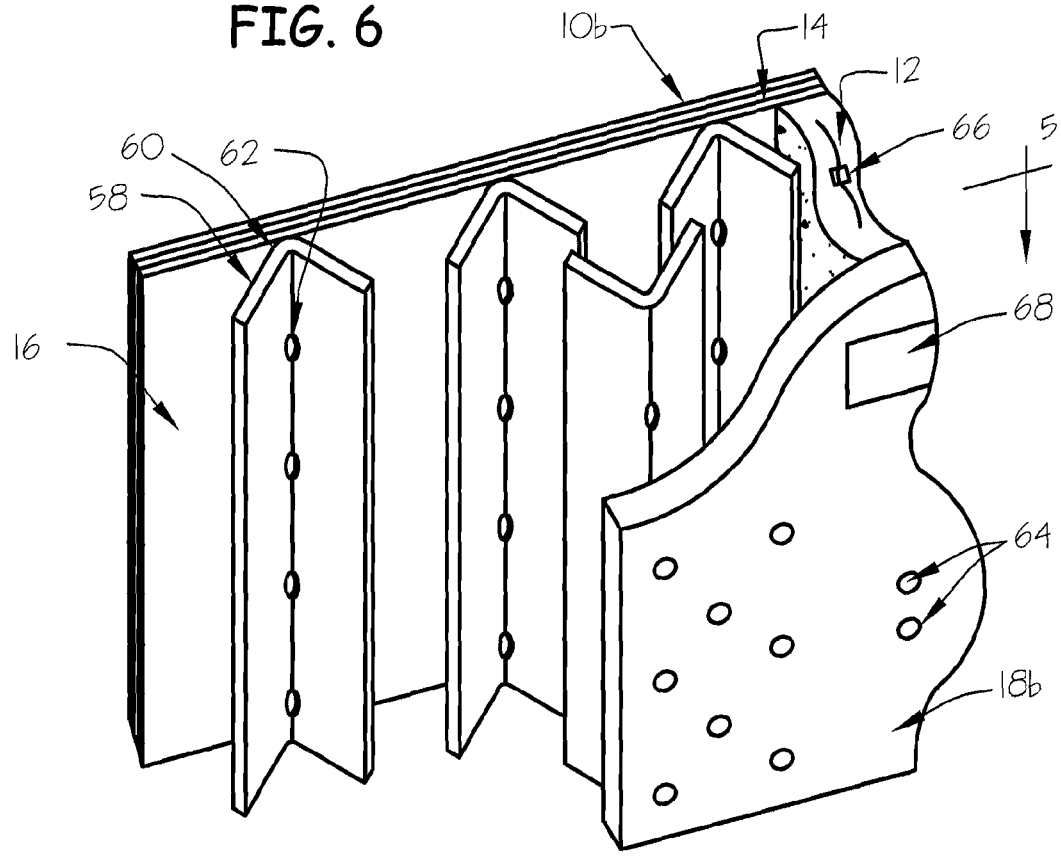
FIG. 6 is a partial cut-away perspective view of the shield shown in FIG. 5.

FIGS. 5 and 6 illustrate another alternative embodiment of the shield 10*b* of the present invention. The shield 10*b* shown in FIGS. 5 and 6 is similar to the shields 10 and 10*a* described above in that it includes a concrete ballistic liner 12 incorporated with a metal chassis 14. The metal chassis 14 again includes a rear plate 16 and a peripheral side wall 20 extending upwardly from the rear plate. Also, the chassis 14 may further include a front plate 18 attached to the rear plate 16 by nuts, bolts and sleeves 24, 26, 28 to form a liner compartment 22, as described above. However, in this embodiment, the internal deflector/concrete integrating structure 29*b* takes the form of a plurality of angle brackets 58 having "v-shaped" cross-sections and whose corners or apices 60 are welded to the rear and front plates 16 and 18 so as to present angled deflecting faces 61. Again, the angle brackets 58, also termed butterflies, are interspersed and spaced so as to present continuous deflecting surfaces. Also, holes or slots 62 are preferably formed in the corners 60 of each bracket 58 to facilitate welding of the bracket to its respective plate.

The rods 54 and brackets 58 shown in FIGS. 4-6 are provided on both the rear plate 16 and the front plate 18. However, it is conceivable that such structure can be provided on either plate alone.

In the embodiment shown in FIG. 6, the forward plate 18*b* includes a plurality of outwardly extending raised protrusions 64 formed thereon. The protrusions 64 are preferably circular or oval in shape to enhance deflection of a projectile and/or dispersion of the impact of a blast along the surface of the forward plate 18*b*.

In all of the both embodiments described herein, the shield can also include at least one, but preferably a plurality of, data sensor(s) 66 embedded in the ultra high strength concrete matrix 12. The sensors 66 detect threats to the shield and/or the structure. For example, a temperature sensor can be used to detect a heat threat to the structure. Other sensors may also be utilized to detect a threat selected from the group consisting of excessive vibration, shock from an explosion and other factors affecting the integrity of the shield assembly.

The shield can also include a system for transmitting threat data to a remote location (not shown). The system can include a transmitter and a power source to receive the threat data from the data sensors and transmit the data to a remote location. In a preferred embodiment, the power source includes a solar collector, such as collector 68 shown in FIG. 6, and the transmitter can transmit the data via wireless communication.

Figure 7:
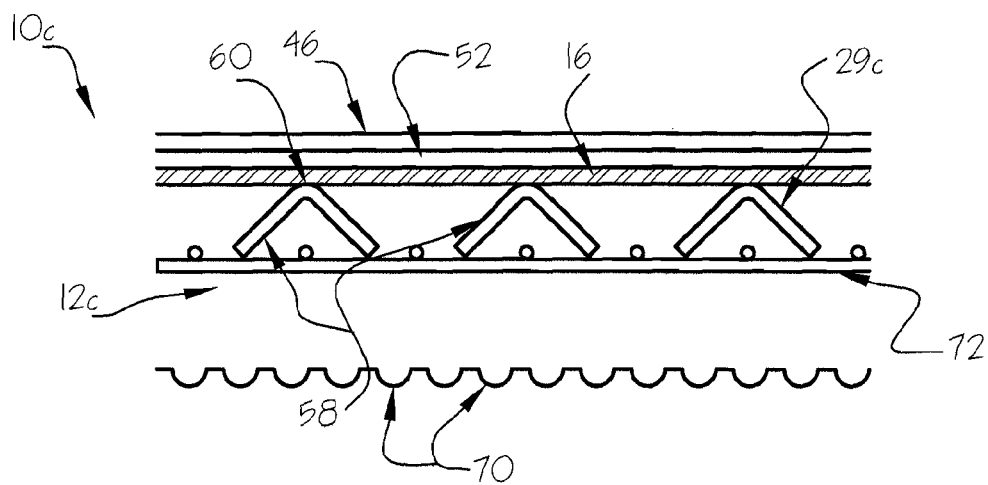
FIG. 7 is a cross-sectional view of yet another alternative embodiment of the shield according to the present invention.

In another alternative embodiment, as shown in FIG. 7, the forward plate has been removed and the shield 10*c* includes a concrete ballistic liner 12*c* with a plurality of outwardly extending raised protrusions 70 formed directly on the outer surface thereof. Like the forward plate protrusions 64 describe above, the integrally formed protrusions 70 are preferably circular or oval in shape to enhance deflection of a projectile and/or dispersion of the impact of a blast along the surface of the ballistic liner.

Also in this embodiment, with the forward plate removed, the internal deflector/concrete integrating structure 29*c* preferably includes a plurality of angle brackets 58 having "v-shaped" cross-sections and whose corners or apices 60 are welded to the rear plate 16, as described above. However, the internal deflector/concrete integrating structure 29*c* further preferably includes a metal mesh 72 welded to the forward ends of the brackets 58 to enhance securement of the concrete 12*c* to the rear plate 16. The metal mesh 72 may consist of a series of vertical and horizontal metal rods welded together in a grid pattern.

Figure 8:
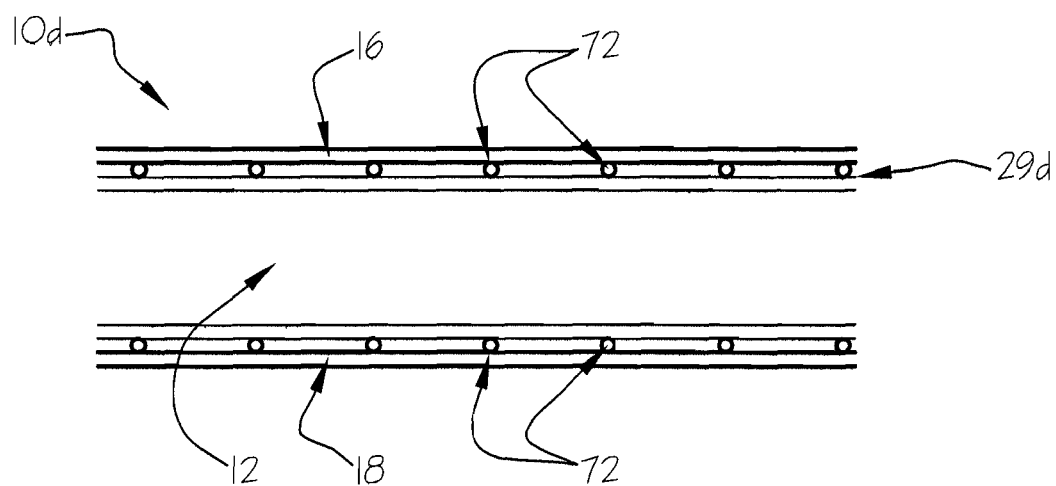
FIG. 8 is a cross-sectional view of still another alternative embodiment of the shield according to the present invention.
Figure 9:
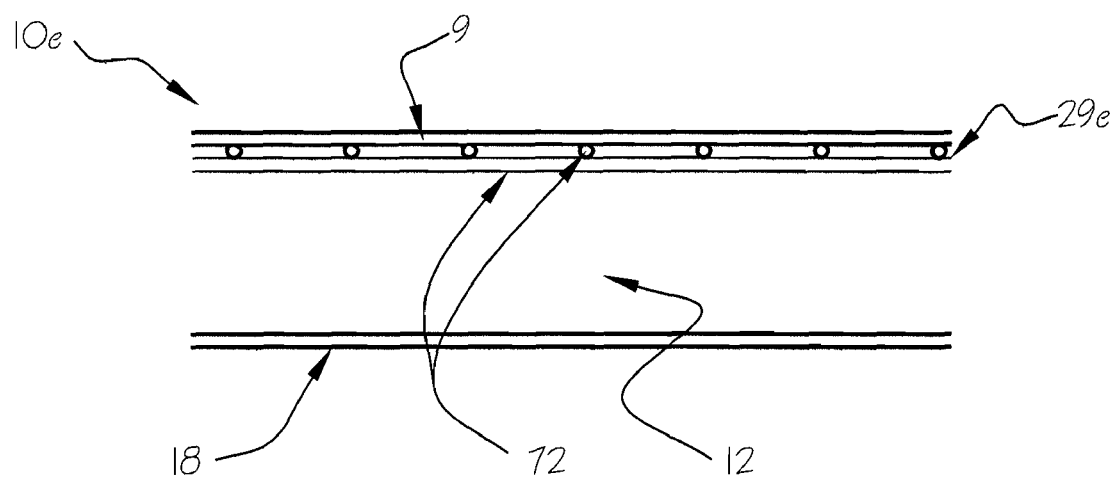
FIG. 9 is a cross-sectional view of still another alternative embodiment of the shield according to the present invention.

FIGS. 8 and 9 respectively show further alternative embodiments of shields 10*d* and 10*e*, wherein an internal deflector/concrete integrating structure 29*d* is formed by welding a metal mesh 72 to each of the rear plate 16 and the front plate 18 (FIG. 8) and wherein an internal deflector/concrete integrating structure 29*e* is formed by welding a metal mesh 72 to only the rear plate 16 (FIG. 9).

Figure 10:
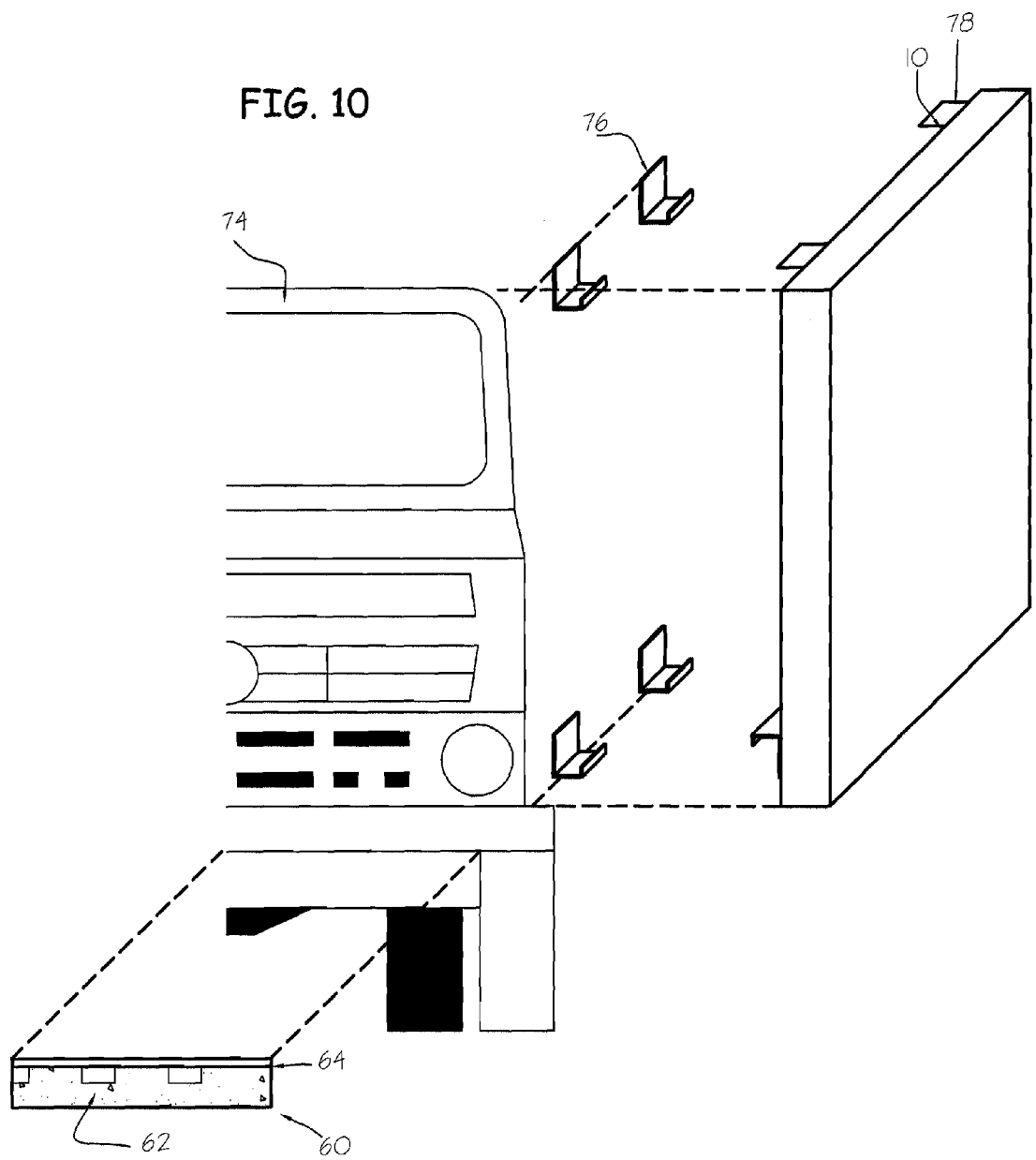
FIG. 10 is a side view of shield plates according to the present invention being attached to an existing vehicle after vehicle manufacture.

As mentioned above, the present invention can be utilized in new construction or manufacture of structures and vehicles, or the shield of the present invention can be attached or otherwise assembled to existing structures or vehicles. Referring now to FIG. 10, when utilized with existing structures, such as a vehicle 74 the shield 10 can be attached to a side or bottom of the vehicle in any number of ways. Preferably, a number of brackets or clips 76 are first fixed to the side or bottom of the vehicle, such as by welding. The rear side of the shield 10 is similarly provided with mounting hardware 78, which cooperate with the brackets 76 fixed to the vehicle 74 to securely mount the shield to the vehicle. Such mounting can be permanent, such as by welding, or removable, such as by bolting.

Any of the shields 10, 10*a*, 10*b*, 10*c*, 10*d*, 10*e* described above can be mounted to an existing vehicle or structure in this manner. Moreover, the shields 10*f*, 10*g*, 10*h* and 10*i* described below can also be utilized in this manner.

Figure 11:
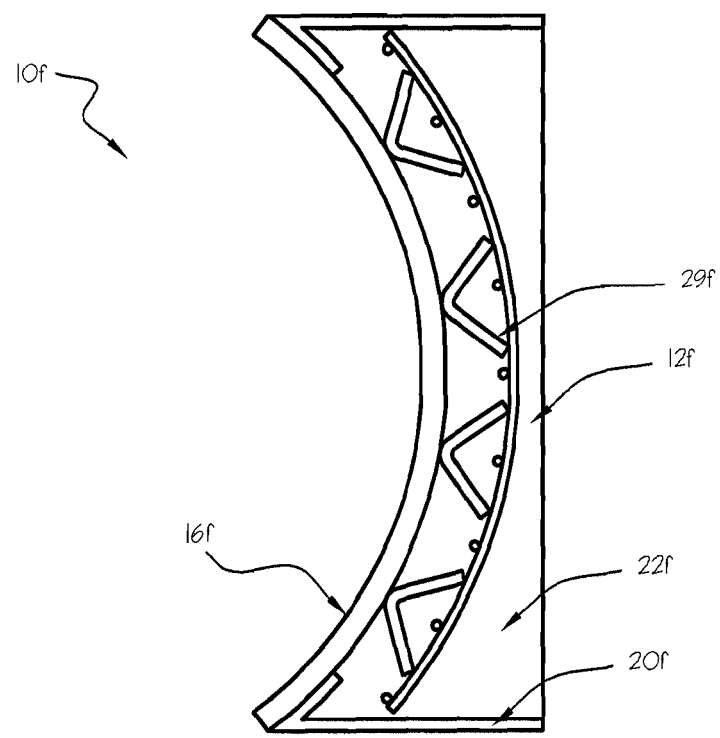
FIG. 11 is a cross-sectional view of still another alternative embodiment of the shield according to the present invention.
Figure 12:
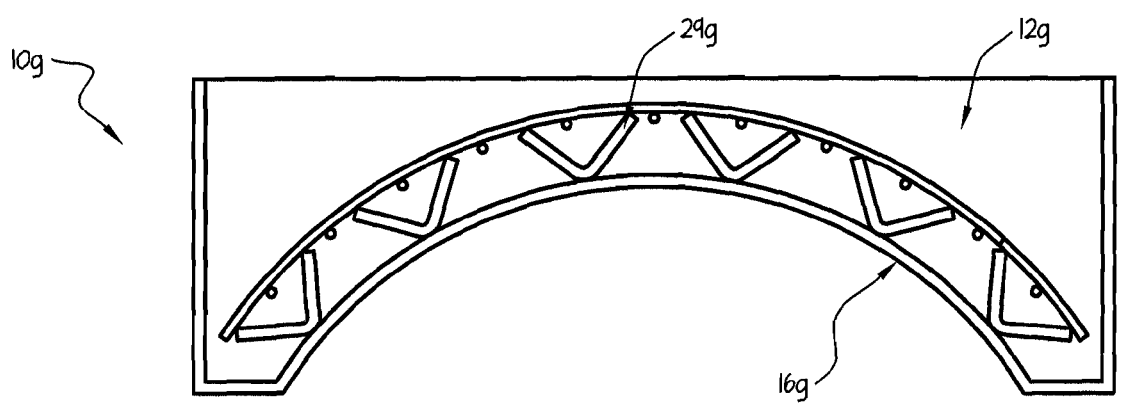
FIG. 12 is a cross-sectional view of still another alternative embodiment of the shield according to the present invention.
Figure 13:
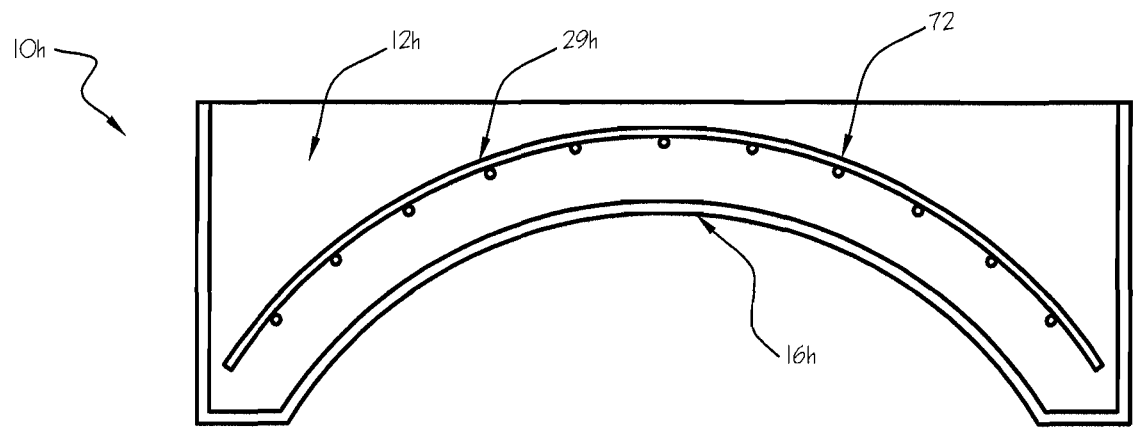
FIG. 13 is a cross-sectional view of still another alternative embodiment of the shield according to the present invention.

Turning now to FIGS. 11-13, still further alternative embodiments are shown in which the rear plate of the shield is provided with a curvature. Specifically, FIG. 11 shows a shield 10*f* including a curved rear plate 16*f* with a peripheral wall 20*f* extending upwardly from the edges thereof to form a concrete liner compartment 22*f* in which a concrete ballistic liner 12*f* is poured. FIGS. 12 and 13 respectively show shields 10*g* and 10*h* including curved rear plates 16*g* and 16*h*, wherein the peripheral side wall is contiguous or integral with the rear plate. The internal deflector/concrete integrating structures 29*f* and 29*g* shown in FIGS. 11 and 12 are similar to the structure 29*c* described above with respect to FIG. 7 with the only difference being the curvature of the structure to match the rear plate 16*f* and 16*g*. In FIG. 13, an internal deflector/concrete integrating structure 29*h* is formed simply of a wire mesh 72 embedded within the concrete ballistic liner 12*h*.

Figure 14:
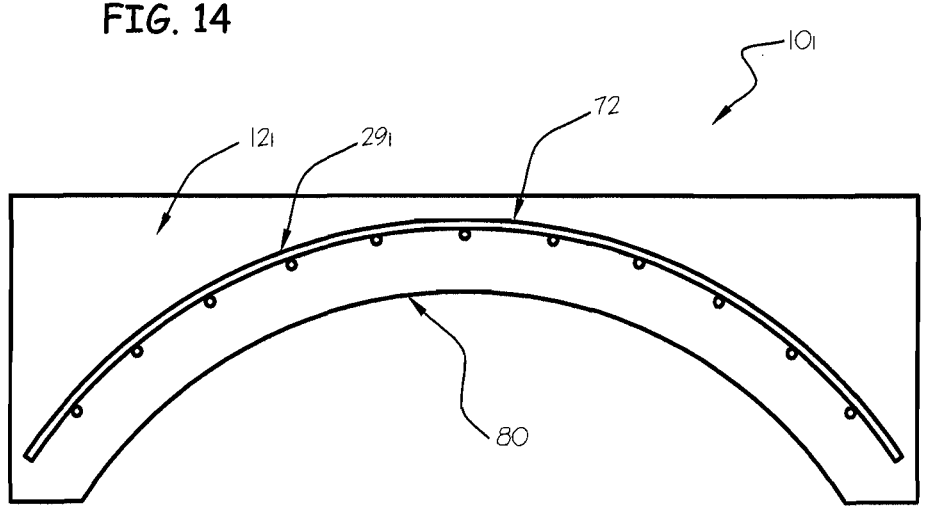
FIG. 14 is a cross-sectional view of still another alternative embodiment of the shield according to the present invention.

FIG. 14 shows yet another alternative embodiment of a shield 10*i*, wherein the rear plate and the front plate have been eliminated. Thus, the shield 10*i* simply includes a concrete ballistic liner 12*i* having a concave rear surface 80 and an internal deflector/concrete integrating structure 29*i* formed of a wire mesh 72 embedded therein.

Figure 15:
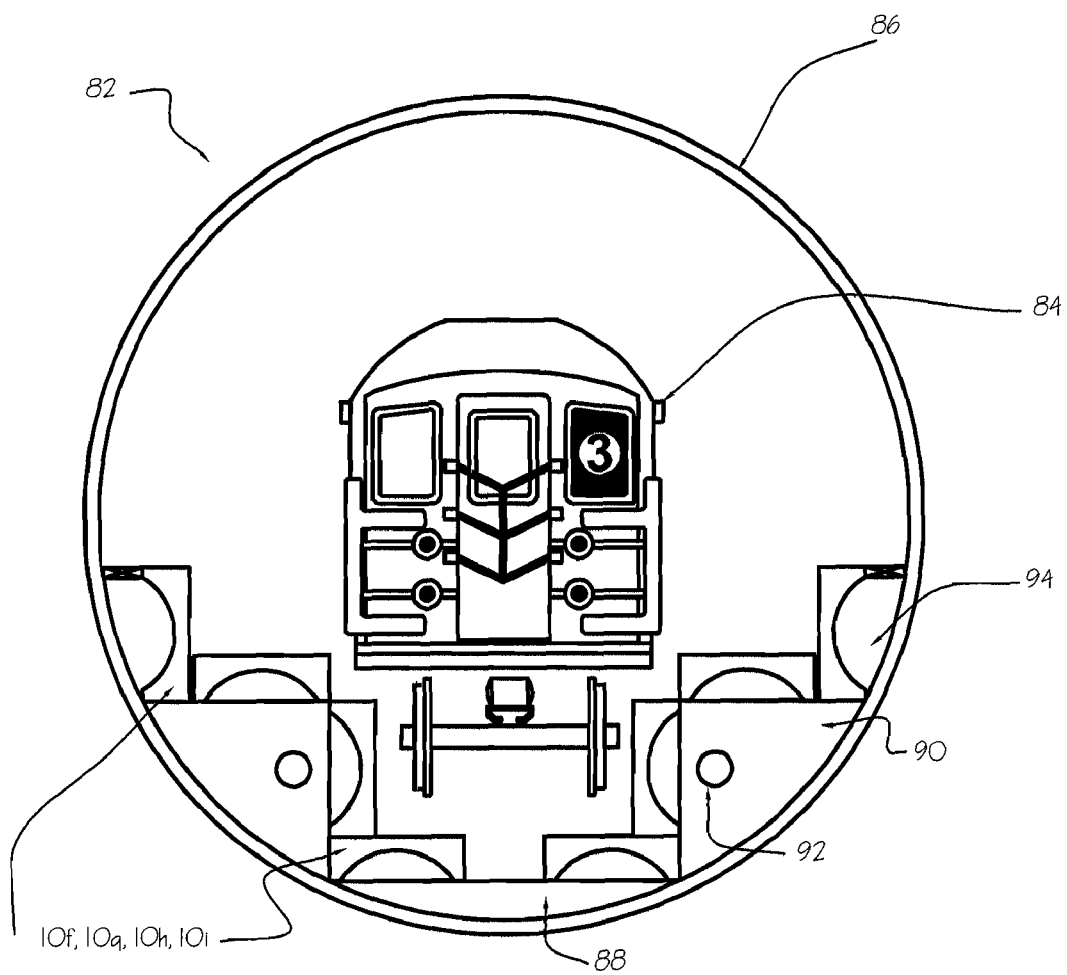
FIG. 15 is a cross-sectional view of the shields shown in FIGS. 11-14 being installed in a pre-existing tunnel structure.

The shields 10*f*, 10*g*, 10*h* and 10*i* shown respectively in FIGS. 11-14 are particularly useful in shielding applications involving pre-existing tunnel structures. As shown in FIG. 15, many transportation systems utilize tunnel structures 82 for conveying trains 84 or other moving vehicles underground or below waterways. Many of such tunnel structures, particularly older tunnel structures, are formed of a cast iron liner 86 provided with a floor 88 to support rails or a roadway. Ledges 90 are also typically provided on both sides of the floor 90 for encasing necessary electrical conduits 92, for example, and also providing a safe platform for passage of any maintenance personnel in the tunnel.

As can be easily discerned, the floor 88 and the ledge 90 of the tunnel structure 82 are the most likely locations for malicious placement of an explosive device. Accordingly, it is most desirable to shield these locations. However, the challenge encountered in shielding these areas is to provide sufficient armor while maintaining enough room on the floor and the ledge to permit passage of maintenance personnel.

This challenge is met by the relatively thin profile of the shield according to the present invention. In particular, use of an ultra high strength concrete incorporated in a metal chassis provides a thin shield plate that can be easily attached to the floor 88 and/or the side wall of the tunnel liner 86. Thus, as shown in FIG. 15, shields 10*f*, 10*g*, 10*h* or 10*i*, as described above with respect to FIGS. 11-14 are fixed to the floor 88 and to the liner atop the ledge 90 in a preferred embodiment. The shields 10*f*, 10*g*, 10*h*, 10*i* can be fixed in any conventional manner, such as by welding or fastening and are oriented so that the concave side of each shield faces the liner 86. In this manner, the concave portions of the shields 10*f*, 10*g*, 10*h*, 10*i* form a space 94 between the shields and the tunnel liner 86, which allows the shield to deflect outwardly upon a blast occurring inside the tunnel 82, without damaging the tunnel liner. While concave shields are preferred in such shielding application, it is also conceivable to utilize any of the shields 10*a*, 10*b*, 10*c*, 10*d* or 10*f* described above with respect to FIGS. 3-9.

Figure 16:
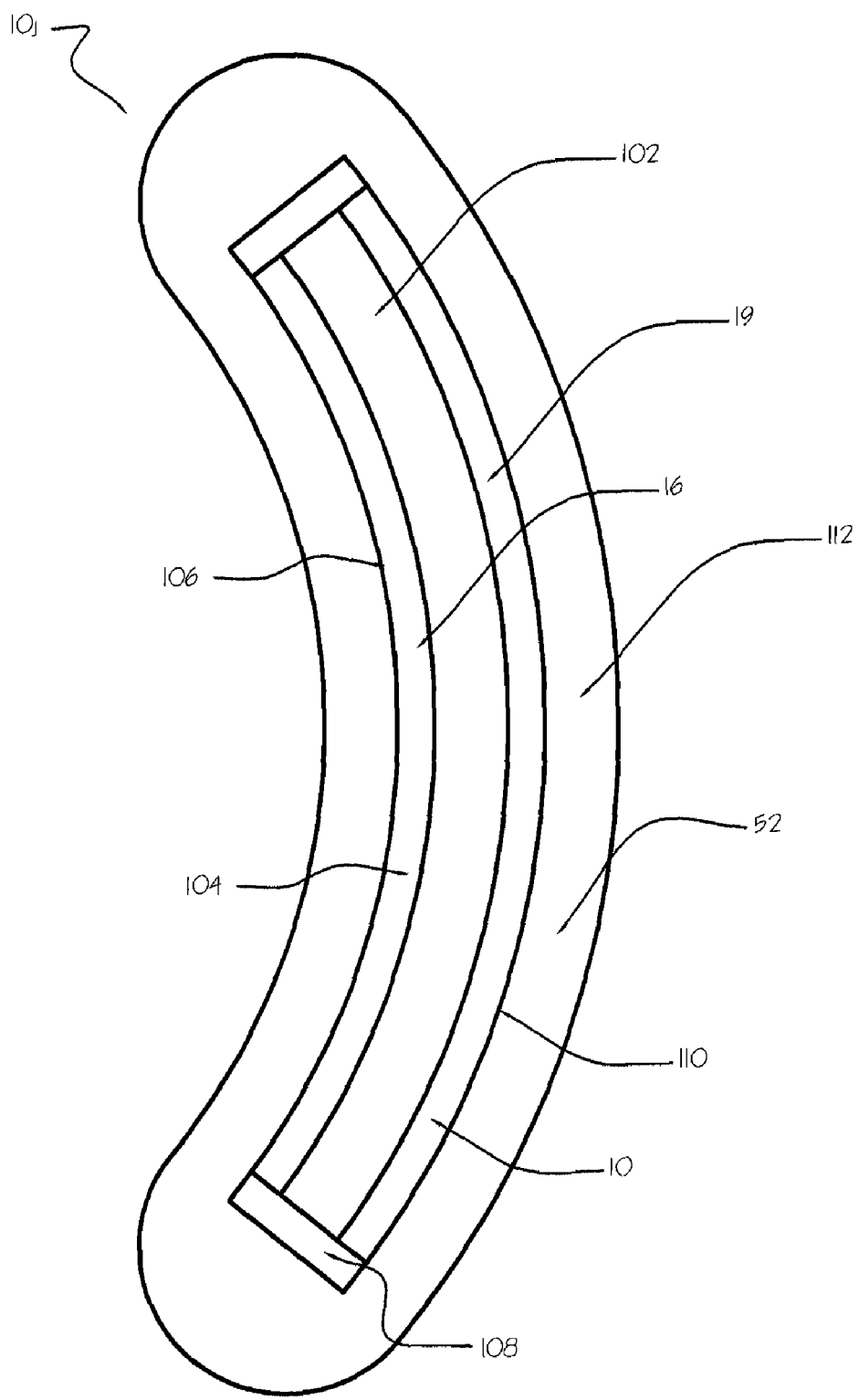
FIG. 16 is a cross-sectional view of still another alternative embodiment of the shield according to the present invention.
Figure 17:
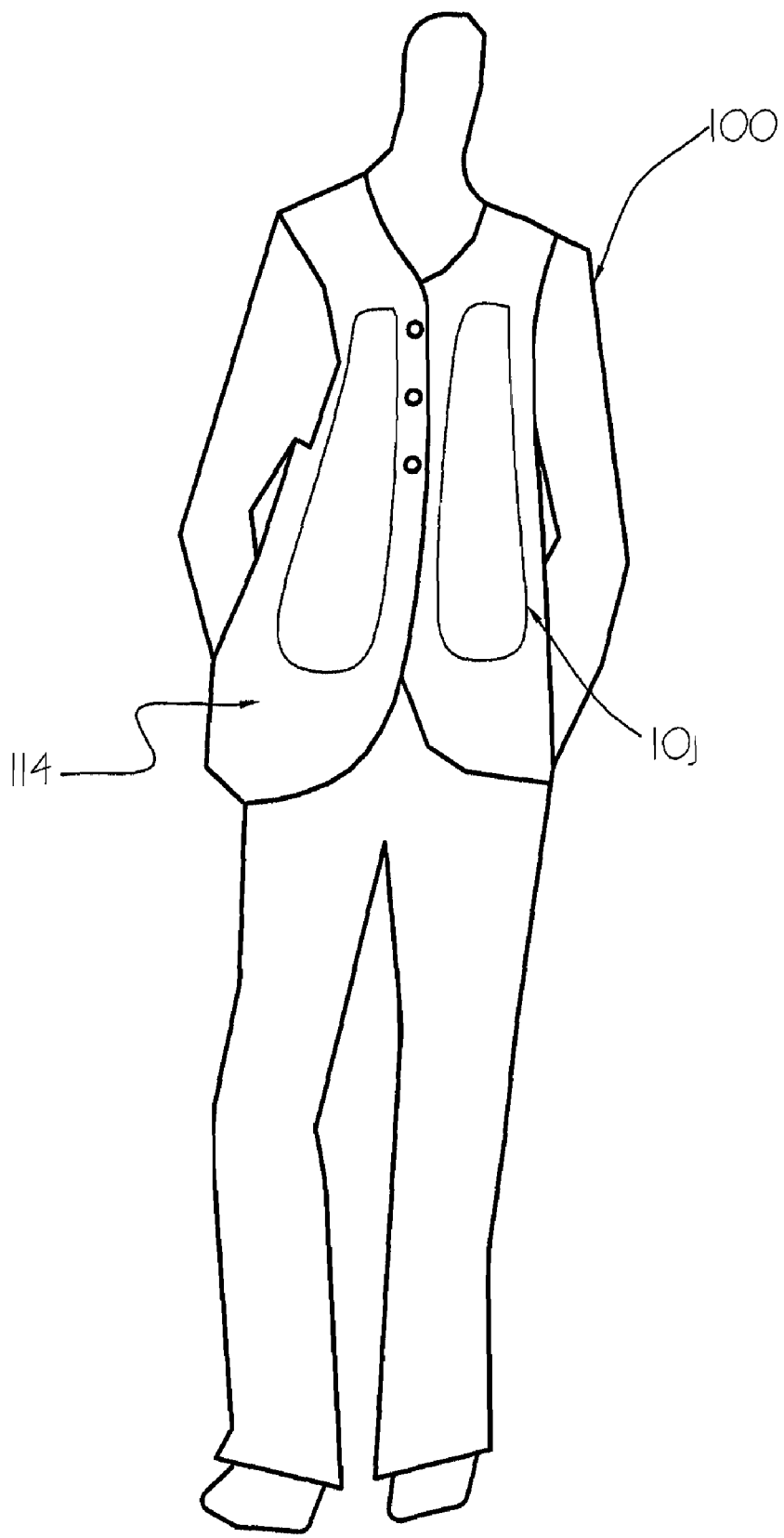
FIG. 17 is a perspective view of the shield shown in FIG. 16 being worn by a person.

Turning now to FIGS. 16 and 17, in still yet another embodiment, a shield 10*j* according to the present invention is provided for shielding a person 100, or other living thing. The shield 10*j* in this embodiment includes a ballistic liner 102 made from an ultra high strength concrete, as described above. However, the concrete liner 102 in this case preferably has a thickness between ⅜ and ½ inches. The liner 102 is integrated with a metal chassis 104, which includes at least a rear plate 106. The chassis 104 may further include a peripheral side wall 108 and a forward plate 110, as described above.

To enhance shielding of personnel, the shield 10*j* further includes a ballistic catcher 112 surrounding and containing therein the ballistic liner 102 and the chassis 104. The ballistic catcher 112 is preferably made from a ballistic fabric or mesh made from a refractory material, similar to the ballistic catcher 52 described above. The catcher 112 may be sewn closed to contain the concrete liner 102 and chassis 104 therein. In this manner, the shield 10*j* can be conveniently inserted into or sewn on a vest or jacket 114 to be worn by a person 100.

Thus, in all of the embodiments described herein, the energy absorbing shield of the present invention includes a concrete casting and a metal chassis with a metal internal deflector/concrete-integrating structure preferably welded to the metal chassis. As compared with traditional metal armor, which typically weighs about 600 pounds per cubic foot, the armor shield of the present invention weighs only about 160 pounds per cubic foot. This amounts to a weight reduction of about two-thirds. This weight reduction is significant, particularly with armored military vehicles where speed and maneuverability are important and with personnel.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims. While there has been described what is presently believed to be preferred embodiments of the invention, those skilled in the art will appreciate that other and further changes and modifications can be made without departing from the scope or spirit of the invention.

What is claimed is:

1. An armor shield for shielding from a projectile and/or an explosive blast, the shield comprising:
   (a) a chassis including a metal shield plate having an interior surface and an opposite exterior surface, a metal forward plate attached to said exterior surface of said shield plate, and an internal deflector/concrete integrating structure fixed to each of said metal shield plate and said metal forward plate, said internal deflector/concrete integrating structure comprising a metal mesh formed by a series of metal rods welded together in a grid pattern; and
   (b) a ballistic liner disposed on said exterior surface of said shield plate, said ballistic liner comprising a cast ultra high strength concrete and defining an exterior impact surface.

2. A shield according to claim 1, wherein said chassis further comprises a peripheral wall extending upward from said exterior surface of said shield plate, said shield plate and said peripheral wall forming a compartment for receiving said ballistic liner.

3. A shield according to claim 1, wherein said ballistic liner is sandwiched between said metal forward plate and said shield plate.

4. A shield according to claim 3, wherein said forward plate defines an exterior impact surface and includes a plurality of outwardly extending protrusions for deflecting a projectile and/or dispersing the impact of a blast.

5. A shield according to claim 1, wherein said internal deflector/concrete integrating structure is embedded within said ballistic liner and comprises a structure for deflecting a projectile passing through said impact surface of said ballistic liner.

6. A shield according to claim 5, wherein said internal deflector structure comprises at least one projectile deflecting rib extending upwardly from said shield plate, said rib presenting an angled surface with respect to said ballistic liner impact surface for deflecting a projectile passing through said impact surface of said ballistic liner.

7. A shield according to claim 6, wherein said projectile deflecting rib comprises a peak portion facing said ballistic liner impact surface and a mid-portion defining said angled surface extending from said peak portion to said shield plate for deflecting said projectile.

8. A shield according to claim 6, wherein said projectile deflecting rib is a cantilevered element having one end fixed to said shield plate and an opposite free end extending away from said shield plate, said free end being movable with respect to said fixed end.

9. A shield according to claim 1, wherein said chassis further comprises a metal spall plate attached at said interior surface of said shield plate for catching any fragments which may break apart from said shield.

10. A shield according to claim 1, wherein said chassis further comprises a ballistic catcher attached at said interior surface of said shield plate, said ballistic catcher comprising a ballistic fabric for catching any fragments which may break apart from said shield.

11. A shield according to claim 1, wherein said concrete comprises metallic fibers.

12. A shield according to claim 11, wherein said concrete comprises:
    (a) a flexure strength Rfl measured on prismatic samples, higher than or equal to 15 MPa; and
    (b) a compression strength Rc measured on cylindrical samples, higher than of equal to 120 MPa, said flexural strength and compression strength being evaluated at the end of a 28 day time period.

13. A shield according to claim 1, further comprising at least one data sensor embedded in said ballistic liner for detecting a threat to said shield.

14. A shield according to claim 13, wherein said sensor detects a threat selected from the group consisting of an elevated temperature, excessive vibrations, an explosive blast and others events affecting the integrity of said shield.

15. A shield according to claim 13, further comprising a source of electrical energy which is solar powered for operating said as least one sensor.

16. A shield according to claim 1, wherein said ballistic liner includes a plurality of outwardly extending protrusions formed on said exterior impact surface for deflecting a projectile and/or dispersing the impact of a blast.

17. A shield according to claim 1, wherein said interior surface of said shield plate has a substantially concave curvature.

18. A shield according to claim 1, wherein said internal deflector/concrete integrating structure is fixed directly to each of said metal shield plate and said metal forward plate.

19. A method for shielding a structure from damage from a projectile and/or an explosive blast comprising the steps of:
    providing a chassis including a metal shield plate having an interior surface and an opposite exterior surface, a metal forward plate attached to said exterior surface of said shield plate, and an internal deflector/concrete integrating structure fixed to each of said exterior surface of said metal shield plate and said metal forward plate, said internal deflector/concrete integrating structure comprising a metal mesh formed by a series of metal rods welded together in a grid pattern;
    casting an ultra high strength concrete on said exterior surface of said shield plate to form a ballistic liner between said shield plate and said metal forward plate, said ballistic liner having an exterior impact surface facing the exterior environment and having said internal deflector/concrete integrating structure embedded therein; and
    attaching said chassis to the structure, wherein said shield plate is more proximal the structure than said ballistic liner.

20. A method according to claim 19, further comprising the step of attaching an internal deflector structure to said shield plate prior to casting said ballistic liner, said internal deflector structure comprising at least one projectile deflecting rib extending upwardly from said shield plate, said rib presenting an angled surface with respect to said ballistic liner impact surface for deflecting a projectile passing through said impact surface of said ballistic liner.

21. A method according to claim 19, further comprising the step of attaching at least one bracket to the structure, and wherein said chassis attaching step comprises attaching the chassis to said bracket.

22. A method according to claim 19, wherein the structure is a tunnel structure for conveying people and/or vehicles, the tunnel structure including a floor and a side wall, and wherein said attaching step comprises the step of attaching said chassis to at least one of the floor and side wall, wherein said shield plate is more proximal the floor and/or side wall than said ballistic liner.

23. A method according to claim 22, wherein said interior surface of said shield plate has a substantially concave curvature, said concave curvature facing the floor and/or sidewall of the tunnel structure.

24. A method as defined in claim 19, wherein said internal deflector/concrete integrating structure is fixed directly to said metal shield plate and said metal forward plate prior to casting said ballistic liner.

25. A method for manufacturing a shield for shielding a structure from damage from a projectile and/or an explosive blast, the method comprising the steps of:

providing a metal shield plate having an interior surface and an opposite exterior surface;

welding an internal deflector/concrete integrating structure to said interior surface of said metal shield plate, said internal deflector/concrete integrating structure comprising a metal mesh formed by a series of metal rods welded together in a grid pattern;

welding a peripheral wall to the metal shield plate, said peripheral wall extending upward from said exterior surface of said shield plate, said shield plate and said peripheral wall forming a compartment;

pouring an ultra high strength concrete into said compartment on said interior surface of said shield plate to form a ballistic liner on said shield plate;

welding an internal deflector/concrete integrating structure to an interior surface of a metal forward plate, said internal deflector/concrete integrating structure comprising a metal mesh formed by a series of metal rods welded together in a grid pattern; and assembling said metal forward plate to said metal shield plate to form the shield, wherein said internal deflector/concrete integrating structure welded to said metal forward plate is embedded within said ballistic liner.

* * * * *